US006952733B1

(12) United States Patent
Felsman et al.

(10) Patent No.: US 6,952,733 B1
(45) Date of Patent: Oct. 4, 2005

(54) SYSTEM AND METHOD FOR RELIABLE MULTICAST DATA DISTRIBUTION OVER AN UNRELIABLE PACKET SWITCHED NETWORK

(75) Inventors: Brian L. Felsman, Torrance, CA (US); David C. Bixler, Hermosa Beach, CA (US); Cary H. Nakamura, Hacienda Heights, CA (US); Ronald N. Orr, Redondo Beach, CA (US); John G. Ringenbach, San Pedro, CA (US); Marsha K. Singer, deceased, late of Alameda, CA (US); by Michael F. Allen, legal representative, Alameda, CA (US); Reno Rubio, Westminster, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 695 days.

(21) Appl. No.: 09/608,614

(22) Filed: Jun. 30, 2000

(51) Int. Cl.$^7$ ................................................ G06F 15/16
(52) U.S. Cl. ...................... 709/227; 709/220; 709/223; 709/235; 709/203; 709/228; 714/748
(58) Field of Search ............................... 709/220–223, 709/235, 203, 228, 227; 714/748

(56) References Cited

U.S. PATENT DOCUMENTS

| | | | | |
|---|---|---|---|---|
| 5,553,083 A | * | 9/1996 | Miller | ...................... 714/748 |
| 5,727,002 A | | 3/1998 | Miller et al. | |
| 5,920,701 A | | 7/1999 | Miller et al. | |
| 5,553,083 A | | 5/2000 | Miller et al. | |
| 6,151,696 A | * | 11/2000 | Miller et al. | ................. 714/748 |
| 6,249,814 B1 | * | 6/2001 | Shaffer et al. | .............. 709/223 |
| 6,717,915 B1 | | 4/2004 | Liao et al. | |

FOREIGN PATENT DOCUMENTS

JP      9-149029      6/1997

OTHER PUBLICATIONS

IEEE, The Multicast Dissemination Protocol (MDP) Toolkit, Joesph P. Macker. 0–7803–5538–5/1999.*
Brian Adamson, et al., "Multicast Dissemination Protocol (MDP) Developer's Guide", http://manimac.itd.nrl.navy.mil/MDP/MdpDevGuide.html, pp. 1–61, May 25, 2000.
Brian Adamson, et al., "The Multicast Dissemination Protocol (MDP)", http://search.ietf.org/internet–drafts/draft–macker–rmt–mdp–00.txt, pp. 1–47, Oct. 22, 1999.
Patent Abstract of Japan, Publication No. 09–149029, Published Jun. 6, 1997, Applicant Fujitsu Ltd.
Tokio Kikuchi, 97–DSM–8–6, *Data Processing and Mbone Dissemination Experiment of Meteorological Satellite GMS–5 Images*, IPSJ SIG Notes, Nov. 21, 1997, vol. 97, No. 111, pp. 31–36 (English statement of relevance attached).

* cited by examiner

*Primary Examiner*—Jack B. Harvey
*Assistant Examiner*—Mitra Kianersi
(74) *Attorney, Agent, or Firm*—Tarolli, Sundheim, Covell & Tummino L.L.P.

(57) ABSTRACT

A system, computer program and method to multicast messages to workstations in a network (10). The system uses an MDP database table (140) which stores the parameters used to manage transmission and reception of multicast messages in the network (10). An MDP server initialization module (100) executing on a server reads the parameters from the MDP database table (140) and initialize an MDP session. The system also uses an MDP client initialization module (130) to read the necessary parameters in the MDP database table (140) and initialize an MDP session in a client workstation that receives multicast messages. An MDP server operations module (120) is used to receive requests to transmit messages and transmit repair packets to a workstation designated as action workstations when a negative acknowledgment is received. An MDP client operations module (140) receives messages transmitted by the MDP server operations module only transmits a negative acknowledgment to a server upon receipt of an MDP information packet if the workstation is designated as an info only workstation in the MDP information packet.

35 Claims, 7 Drawing Sheets

FIG. 7

| Byte Number | Description |
|---|---|
| 1-4 | Number of Addressees (Integer) |
| 5-8 | IP Address of 1st addressee (Integer) |
| 9-12 | EMCON Setting for 1st addressee (Integer)<br>　　Disable = "Action"<br>　　Enable = "Info" |
| 13-16 | IP Address of 2nd addressee (Integer) |
| 17-20 | EMCON Setting for 2nd addressee (Integer)<br>　　Disable = "Action"<br>　　Enable = "Info" |
| . | . |
| . | . |
| . | . |
| . | . |
| 125-128 | IP Address of 16th addressee (Integer) |
| 129-132 | EMCON Setting for 16th addressee (Integer)<br>　　Disable = "Action"<br>　　Enable = "Info" |

1000 — Number of Addressees row
1010 — IP Address rows
1020 — EMCON Setting rows

SYSTEM AND METHOD FOR RELIABLE MULTICAST DATA DISTRIBUTION OVER AN UNRELIABLE PACKET SWITCHED NETWORK

STATEMENT REGARDING FEDERALLY SPONSORED RESEARCH OR DEVELOPMENT

This invention was made with Government support under contract number DAABO7-95-D-E604 awarded by the United State Army. The Government has certain rights in the invention.

FIELD OF THE INVENTION

The invention relates to a system and method for reliable multicast distribution over an unreliable packet switched network. More particularly, the invention employs a system, method and computer program to allow access to and control of an unreliable low bandwidth wireless packet switched communications network to enable the reliable multicast of messages to terminals on the network.

BACKGROUND OF THE INVENTION

Over the relatively short history of the computer industry dramatic changes have occurred. The most significant of these changes has been the incredible drop in hardware prices along with the equally incredible improvement in performance, reliability, size and ruggedness of computer hardware. The reliability and performance of computers have improved to the point where the military is able to place computers in individual combat vehicles. In this manner a wide area network of computers is formed which may be used to receive orders and other mission critical data, such as the position of enemy and friendly troops, as well as their movements. However, several challenges are encountered that are unique to this type of network and other challenges that are common to all types of networks. One of these unique challenges is that the network must operate in a hostile and mobile battlefield environment which makes the use of cable for high-speed communications out of the question. Only radio or microwave communications methods could be utilized either directly, or via a satellite system. Thus, such a network would have to send messages using a relatively slow low bandwidth communications medium. Of course, a network based on the use of cellular telephones or other radio or microwave frequency technologies would experience the same bandwidth problems regardless of where or how it is used. Another challenge experienced by any type of network is the sheer size such a network may take. Thousands of nodes of various types of computers may have access to a network. However, the use of radio or microwave communications limits the speed at which data may be transmitted over the network. Even when a high-speed cable-based network is utilized, due to the large number of nodes on a network, it is often difficult to broadcast or multicast a message to a large number of users due to the bandwidth consumed. A broadcast message is a message that would be sent from one node to all nodes on the network, while a multicast message would be is a message sent from one node to more than one node but not all nodes on the network.

Presently, TCP/IP (Transmission Control Protocol/Internet Protocol) is utilized for communications over the World Wide Web. Communications using TCP ensures that the total number of packets and the total number of bytes sent in the message are correctly received at the receiving terminal. Simply, this is accomplished through the transmission of acknowledgments by the receiving terminal to the sending terminal. If a packet is not received or there are bytes missing in a packet, the sending terminal receives a retransmission request from the receiving terminal. TCP works well when sending a message to a single or small number of receivers. However, when sending a single message to a large number of receiving terminals is necessary, the volume of traffic on the network becomes burdensome due to the overhead created by TCP. Therefore, TCP is more suitable for a unicast (point-to-point) communications environment.

To solve this overhead problem seen in TCP related to sending multicast messages to a large number of users, UDP (User Datagram Protocol) was developed. UDP is a protocol within TCP/IP and is utilized when reliable message delivery is not required. Lost packets and lost data within packets is simply ignored and no acknowledgments or requests for retransmission are sent back to the sending terminal. UDP is typically used for transmission of audio and video traffic in which a limited amount of data loss may be tolerated. Therefore, UDP is more suitable for a multicast environment in which one source transmits simultaneously to many receivers.

However, neither TCP nor UDP are suitable for environment in which a low bandwidth communications mechanism is used and it is necessary to ensure that at least certain user terminals receive a particular multicast message. This is most evident in the battlefield communications environment previously discussed where radio communications acts as the primary link between nodes in the network and critical messages or orders must be received simultaneously by a relatively large number of terminals.

In order to overcome the limitations of TCP and UDP the United States Naval Research Laboratory developed Multicast Dissemination Protocol (MDP). MDP is a protocol framework designed to reliably transmit multicast messages with low overhead. MDP services sit on top of the generic UDP/IP multicast transport layer found within TCP/IP. Low overhead is achieved through the use of negative acknowledgments as opposed to the acknowledgments typically used by TCP and the complete lack of any acknowledgments in UDP. However, at the same time, MDP will assure that selective recipients will receive a message or at least be aware that a message was only partially received. MDP is described in an Internet-Draft (draft-maker-rmt-mdp-00.txt) written by Brian Adamson and Joe Macker entitled "The Multicast Dissemination Protocol (MDP)", published on Oct. 22, 1999 and herein incorporated in its entirety by reference. Adamson and Macker have also published a "Multicast Dissemination Protocol (MDP) Developer's Guide" which is also herein incorporated in its entirety by reference. As discussed in the foregoing mentioned Developer's Guide, MDP provides its primary interface through application programming interfaces (API).

However, as with TCP and UDP, MDP is a protocol and does not provide the application layer or other higher level software necessary for a systems administrator to fine tune MDP to achieve the optimum level of performance for a particular network. Fine-tuning would detail setting numerous parameters such as packet size and transmission rate. This fine-tuning of a network can have a significant impact on the performance of the network and on the satisfaction of the users of the network. However, it is not possible to fine tune a network without some mechanism of testing or determining the network's performance and testing or determining how changes to parameters have impacted the performance of the network.

Further, an additional layer of software is required to facilitate the sending and receiving of messages by a user. Also, this additional layer of software should enable the user to select message recipients while keeping overhead to an absolute minimum. This would entail the ability of the user to distinguish among potential recipients and identify those that it is critical for the message to be received by.

Therefore, what is needed is a system and computer program which will initialize an MDP application. This system and computer program should also enable the fine-tuning of the MDP network. Further, this system and computer program should allow users to send and receive messages to others on the network while maintaining minimal overhead for the network. The system and computer program should be able to distinguish between critical recipients of a message and non-critical recipients. This system and computer program should only transmit to identified recipients on the network and not attempt to transmit a message indefinitely to a user or workstation.

SUMMARY OF THE INVENTION

An embodiment of the present invention provides for a system and computer program to multicast messages to several terminals in a network. This system and computer program has an MDP database table containing parameters used to manage transmission and reception of multicast messages in the network. An MDP server initialization module reads the parameters from the MDP database table and initializes an MDP session utilizing these parameters in a server. An MDP client initialization module reads the parameters from the MDP database table and initializes an MDP session utilizing the parameters in a workstation. An MDP server operations module receives requests to transmit messages, creates a MDP information packet for each message, and transmits the message to each recipient designated in the MDP information packet. The system and computer program also has an MDP client operations module to receive message transmitted by the MDP server operations module and transmit these messages to a higher level software application.

Further, an embodiment of the present invention is a method to multicast messages to several workstations in a network. This method begins by reading several parameters from an MDP database used to initialize and control the transmission of a multicast message on a server. It then reads several parameters from an MDP database used to initialize and control the reception of a multicast message on a workstation. The multicast message is then transmitted to the workstations when a message delay time does not exceed a time computed to transmit the multicast message or the message delay time does not exceed a perishability time contained within multicast message. Thereafter, negative acknowledgments are transmitted to the server when the workstation determines that data in the multicast message is missing and when the workstation was designated as an action workstation within a field contained within the MDP information packet.

These and other features of this system, method and computer program will become more apparent from the following description when taken in connection with the accompanying drawings which show, for purposes of illustration only, examples in accordance with the present invention.

BRIEF DESCRIPTION OF THE DRAWINGS

The foregoing and a better understanding of the present invention will become apparent from the following detailed description of exemplary embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto. The spirit and scope of the present invention are limited only by the terms of the appended claims.

The following represents brief descriptions of the drawings, wherein:

FIG. 7 is a table of an MDP information packet used in an example embodiment of the present invention.

DETAILED DESCRIPTION

Figure 1:
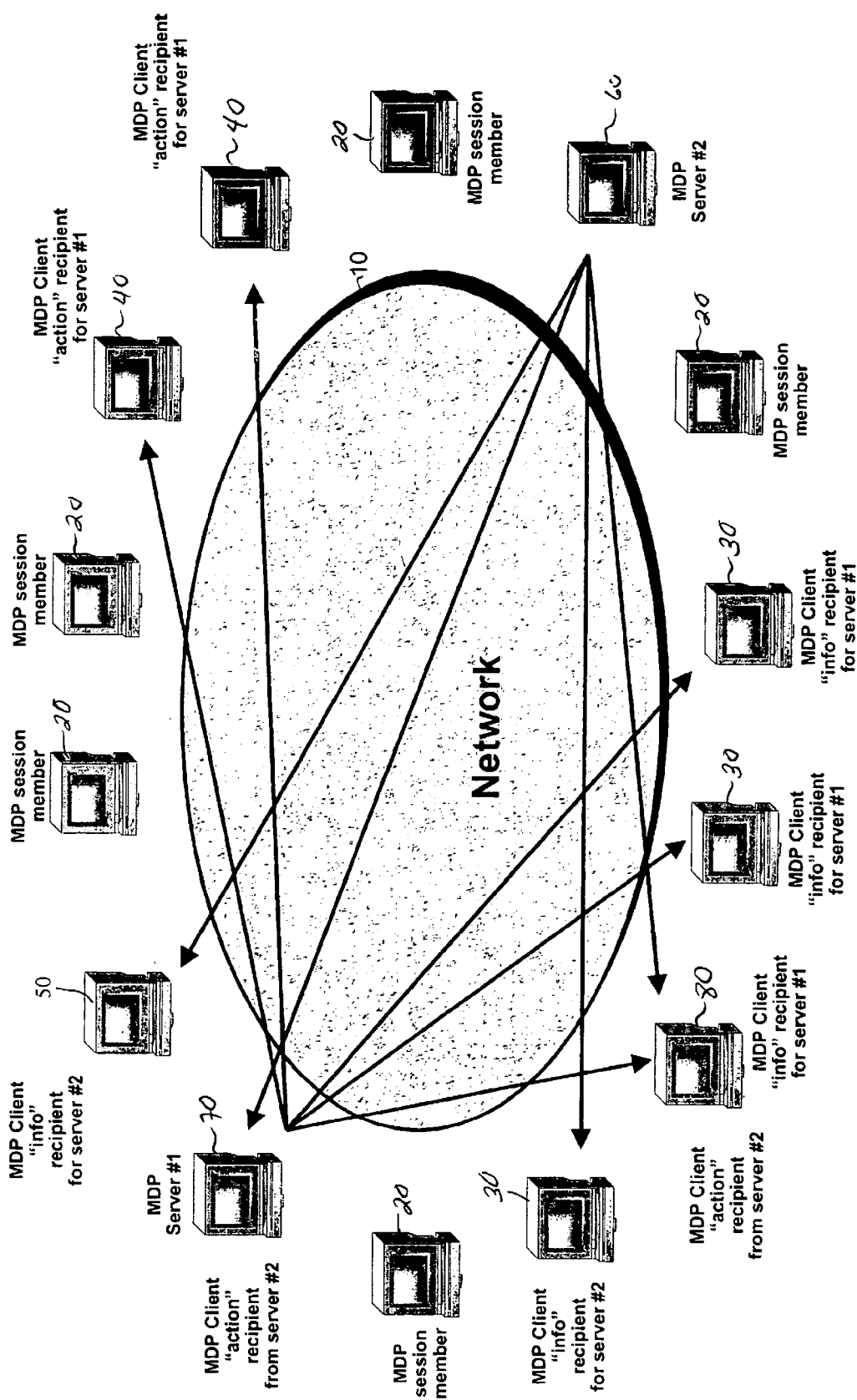
FIG. 1 is an example of a network having numerous terminals of varying categories.

Before beginning a detailed description of the subject invention, mention of the following is in order. When appropriate, like reference numerals and characters may be used to designate identical, corresponding or similar components in differing figure drawings. Further, in the detailed description to follow, exemplary sizes/models/values/ranges may be given, although the present invention is not limited to the same.

FIG. 1 is an example of a wide area network 10 having numerous terminals and users connected thereto. Each terminal or user is given a designation based primarily upon whether it is a target of a transmitted multicast message. Further, each terminal is given an Internet protocol (IP) address. If a terminal or user is not currently the target of a message then it is identified as an MDP session member 20. An MDP session member 20 is part of the network 10, but is not currently designated as a recipient of a multicast message. However, if a user or terminal is designated as a recipient of a multicast message, the user or terminal may be identified as either an MDP client action recipient 40 or an MDP client info recipient 30. An MDP client action recipient 40 is a user or terminal which must reliably receive the multicast message in its entirety. The MDP client action recipient 40 would therefore utilize the full negative acknowledgment capability found in MDP to insure receipt of the multicast message. However, the MDP client info recipient 30 would not be deemed by the message sender to be a critical recipient of the multicast message. Therefore, the MDP client info recipient 30 would passively receive any multicast message sent and only acknowledge, at most, the receipt of a header or MDP information packet, as shown in FIG. 7. Multicast messages are only sent by servers. In the example shown in FIG. 1, there are two servers provided, MDP server #2 60 and MDP server #1 70. These servers would initialize the MDP parameters and multicast messages to designate users. Each user or terminal designated for receipt of a message would be identified by the server transmitting the multicast message as either an info recipient or an action recipient. This designation by a server would be accomplished through fields contained in the MDP information packet, shown and further discussed in reference to FIG. 7.

Still referring to FIG. 1, it should be noted that a user or terminal may be designated simultaneously as both an action recipient for one multicast message and an info recipient for another multicast message as designated by MDP client 80. This is possible since the sender of a multicast message determines whether a recipient is an action or info recipient in the MDP information packet, shown in FIG. 7. Further, a user or terminal may be designated as both a server and either an MDP client info recipient or an MDP client action recipient as shown for MDP server #1 70. Also, any terminal or user on network 10 may be designated as a server.

The terminals or workstations shown in FIG. 1 may be any processor based system including, but not limited to, a personal computer (PC), laptop, palm computer, and personal digital assistant (PDA). Further, the terminals or workstations shown in FIG. 1 may also be wireless access protocol (WAP) capable cellular telephones or a hypertext markup language protocol (HTML) capable cellular telephone. The only requirement that the terminals or workstations shown in FIG. 1 have is they must be able to transmit and receive messages from a IP network with multicast capabilities.

Still referring to FIG. 1, the network 10 may be any packet switched network operating over any medium including, but not limited to, a wireless communications medium, coaxial or fiber-optic cable, and twisted pair or leased line telephone wires. Further, the wireless communications medium may include, but not limited to, any radio frequency, microwave, satellite or cellular phone transmission medium. It should be noted that the embodiments of the present invention are most effective and useful in generating reliable multicast messages in an environment where bandwidth is unreliable and slow, such as may be seen in a wireless communications environment. However, as previously mentioned, the example embodiments of the present invention may be used in any communications environment.

Figure 2:
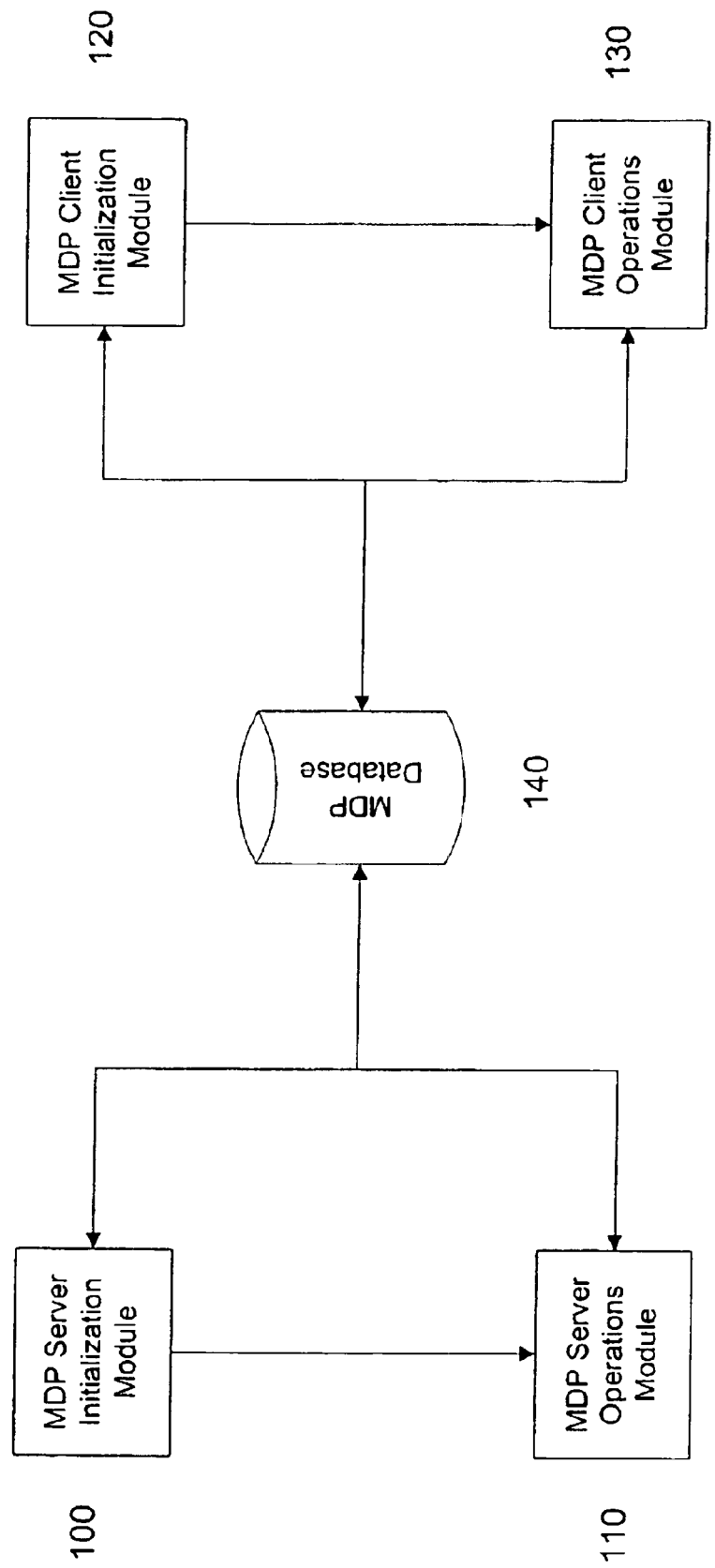
FIG. 2 is a module configuration diagram of the software, firmware, and hardware used in the embodiments of the present invention.

FIG. 2 is a module configuration diagram of the software, firmware, and hardware used in the embodiments of the present invention. The blocks illustrated in FIG. 2 represent modules, code, code segments, commands, firmware, hardware, instructions and data that are executable by a processor-based system(s) and may be written in a programming language, such as, but not limited to, C++. In addition to the blocks illustrated FIG. 2, an MDP database 140 is shown that contains the MDP layers software and parameters and may be also be referred to as the MDP sessions mini structured query language (MSQL) database table.

Still referring to FIG. 2, four blocks or modules are illustrated. An MDP server initialization module 100 and MDP server operations module 110 reside and are executed on those workstations or processor based systems designated as MDP server #1 70 and MDP server #2 60, shown in FIG. 1. However, as mentioned previously, any processor based system connected to network 10 may be designated as a server. Upon start-up of a server, the MDP server initialization module 100 is executed in order to retrieve and set the initial MDP parameters. Thereafter, processor control is relinquish by the MDP server initialization module 100 and the MDP server operations module 110 is executed. The MDP server operations module 110 continues execution as long as required. Both the MDP server initialization module 100 and the MDP server operations module 110 read and write to MDP database 140.

Still referring to FIG. 2, MDP client initialization module 120 and MDP client operations module 130 are stored in and executed under all remaining workstations and processor based systems shown in FIG. 1 that are not designated as servers. Upon start-up of a client system the MDP client initialization module 120 is executed in order to retrieve and set the initial MDP parameters. Thereafter, processor control is relinquished by the MDP client initialization module 120 and the MDP client operations module 130 is executed. The client operations module 130 continues execution indefinitely as long as required. Both the MDP client initialization module 120 and the MDP client operations module 130 read and write to MDP database 140.

Figure 3:
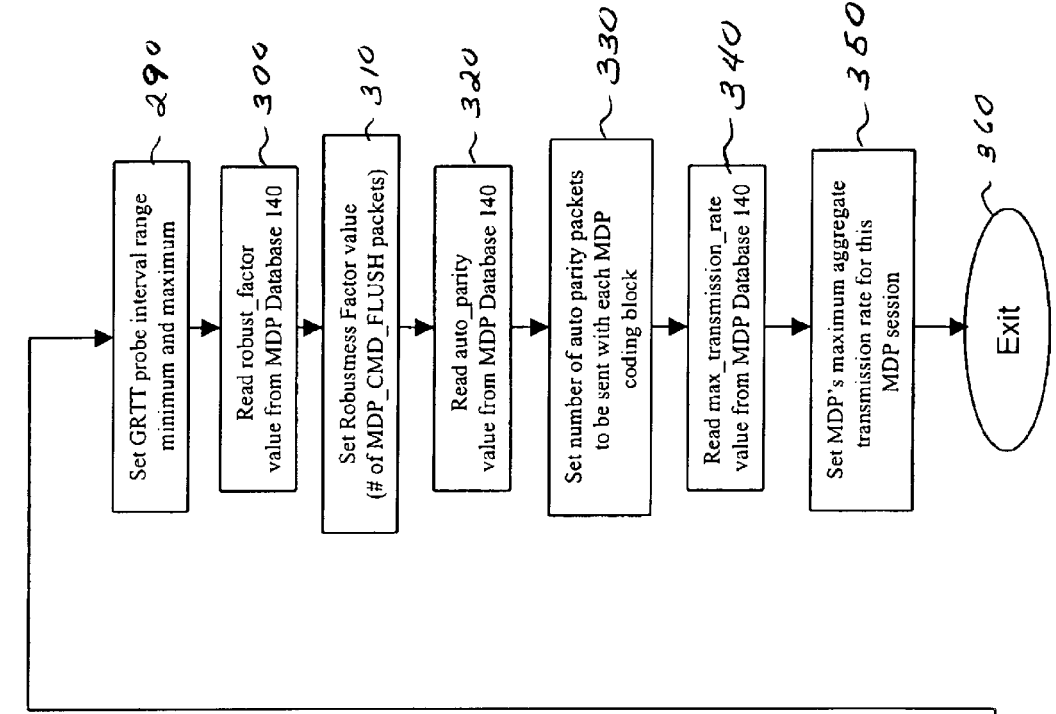
FIG. 3 is a flowchart of an MDP server initialization module, shown in FIG. 2, used in an example embodiment of the present invention.
Figure 3:
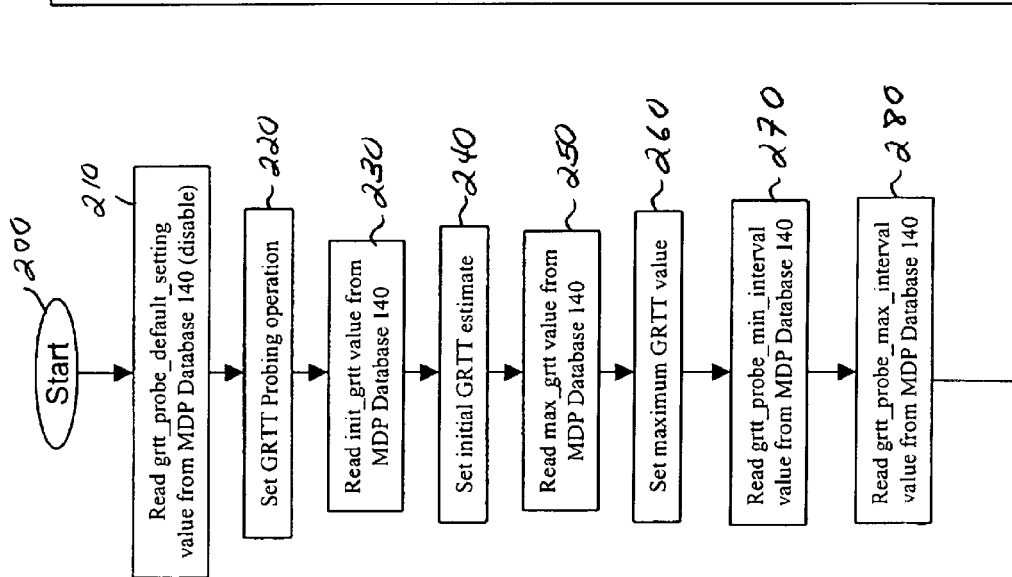

FIG. 3 is a flowchart of an MDP server initialization module 100, shown in FIG. 2, used in an example embodiment of the present invention. The MDP server initialization module 100 includes, but is not limited to, operations 200 through 360 shown in FIG. 3.

Referring to FIG. 3, the MDP server initialization module 100 begins execution in operation 200 upon initial start-up of a server as shown in FIG. 1. Processing immediately proceeds to operation 210 in which the greatest round-trip time (GRTT) probe default setting value is read from the MDP database 140 which has a value representing either disabling or enabling probing. In this case, the default value for GRTT probing is to disable probing. Probing is the active sending of an MDP message to nodes on network 10 and measuring the time needed for a response to come back from each node. In the case of initial start-up, probing should be disabled. Thereafter, processing proceeds to operation 220 where the GRTT probing is set for this MDP session. In operation 230 the initial GRTT (init_grtt) value is read from the MDP database 140. This initial GRTT value represents the greatest round-trip time stored as a default value in the MDP database 140. Thereafter, in operation 240, the retrieved initial GRTT value is set as the GRTT estimate for this MDP session. In operation 250, the maximum GRTT (Max_grtt) value is read from MDP database 140 and is set in operation 260 for this MDP session. This maximum GRTT value represents the maximum amount of time it should take for a return response to be received from a node in network 10 and the maximum value that the GRTT will be allowed to grow to. Thereafter, in operation 270, the GRTT probe minimum interval value is read from the MDP database 140. In operation 280, the GRTT probe maximum interval value is read from the MDP database 140. The GRTT probe minimum interval value is the initial interval at which probing will occur as discussed ahead. A probe is a test multicast message which is timed to determine how long it takes for a response to return from the nodes or workstation. When probing occurs the interval between probes will be increased until the interval between probes reaches the GRTT probe maximum interval value. In operation 290, both the minimum and maximum GRTT probe values is set in this MDP session.

Still referring to FIG. 3, in operation 300 a robust factor value is read from the MDP database 140. This robust factor value represents the number of flush commands that are sent out. Flush commands are commands sent by a server to indicate it would no longer be transmitting packets related to a particular message which includes repair packets. These flush commands would be sent out at periodic intervals and a robust factor value relates to the maximum number that will be sent out. Thereafter, processing proceeds to operations 320 where the auto parity value is read from the MDP database 140. This auto parity value is the number of forward error correcting packets that are sent out with the message. Using these forward error correcting packets a corrupted or lost packet of data may be repaired at a receiving node or workstation. Thereafter, in operation 330, the number of all parity packets sent with each MDP coding block is set in this MDP session. In operation 340, the maximum transmission rate value is read from the MDP database 140. This maximum transmission rate value is the maximum transmission rate for the network 10 in bits per second. Thereafter, in operation 350, this maximum aggregate transmission rate is set in the MDP session. In operation 360, the MDP server initialization module 100 terminates execution and exits.

Figure 4:
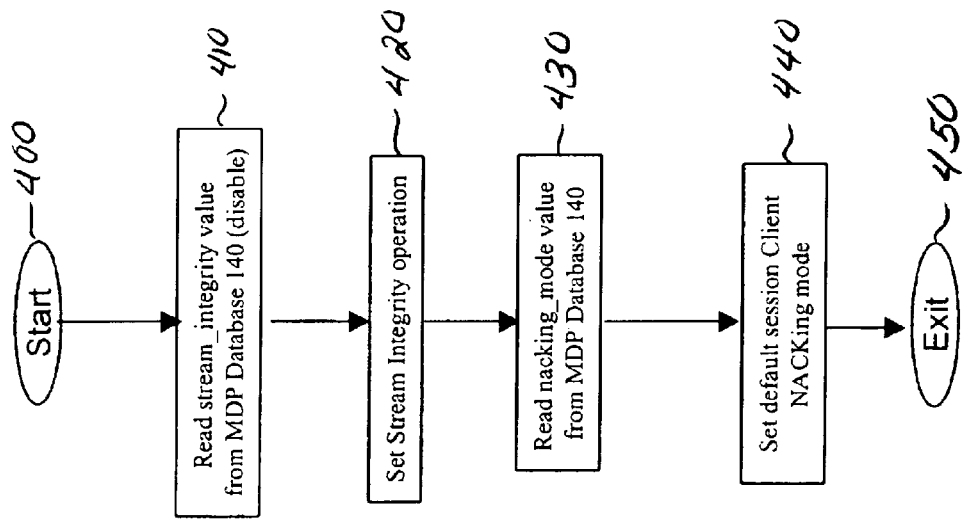
FIG. 4 is a flowchart of an MDP client initialization module, shown in FIG. 2, used in an example embodiment of the present invention.

FIG. 4 is a flowchart of an MDP client initialization module 120, shown in FIG. 2, used in an example embodiment of the present invention. The MDP client initialization module 120 includes, but is not limited to, operations 400 through 450 shown in FIG. 4.

The MDP client initialization module 120 begins execution in operation 400 and immediately proceeds to operation 410. In operation 410, the default stream integrity value is read from the MDP database 140 which upon initialization of a client node or workstation is set to disable. By disabling stream integrity when a message having several blocks or packets is received by a client workstation having a missing or out of sequence packet, the workstation will not request the retransmission from the server. Processing then proceeds to operation 420 where the stream integrity value is set. In operation 430, the default nacking (negative acknowledgment) mode is read from the MDP database 140. A negative acknowledgment is normally transmitted when a message or a piece of a message is not received by a recipient. If all portions of a message are received by the recipient then no response is given to the server sending the message. In this particular case, the default nacking mode is to nack (send negative acknowledgment) only upon failure to receive an MDP information packet, as shown in FIG. 7. Thereafter, in operation 440, the default session client nacking mode is set for this MDP session. Processing then proceeds to operation 450 where the MDP client initialization module 120 exits and control of the processor is given to the MDP client operations module 130.

Both the MDP server initialization module 100 and the MDP client initialization module 120 are executed simultaneously. Once both the client nodes and the server nodes have been initialized for this MDP session, processing immediately proceeds to an MDP server operations module 110 in the server and an MDP client operations module 130 for each client node. Both the MDP server operations module 110 and the MDP client operations module 130 would execute continuously as long as the current MDP session remains in effect.

Figure 5:
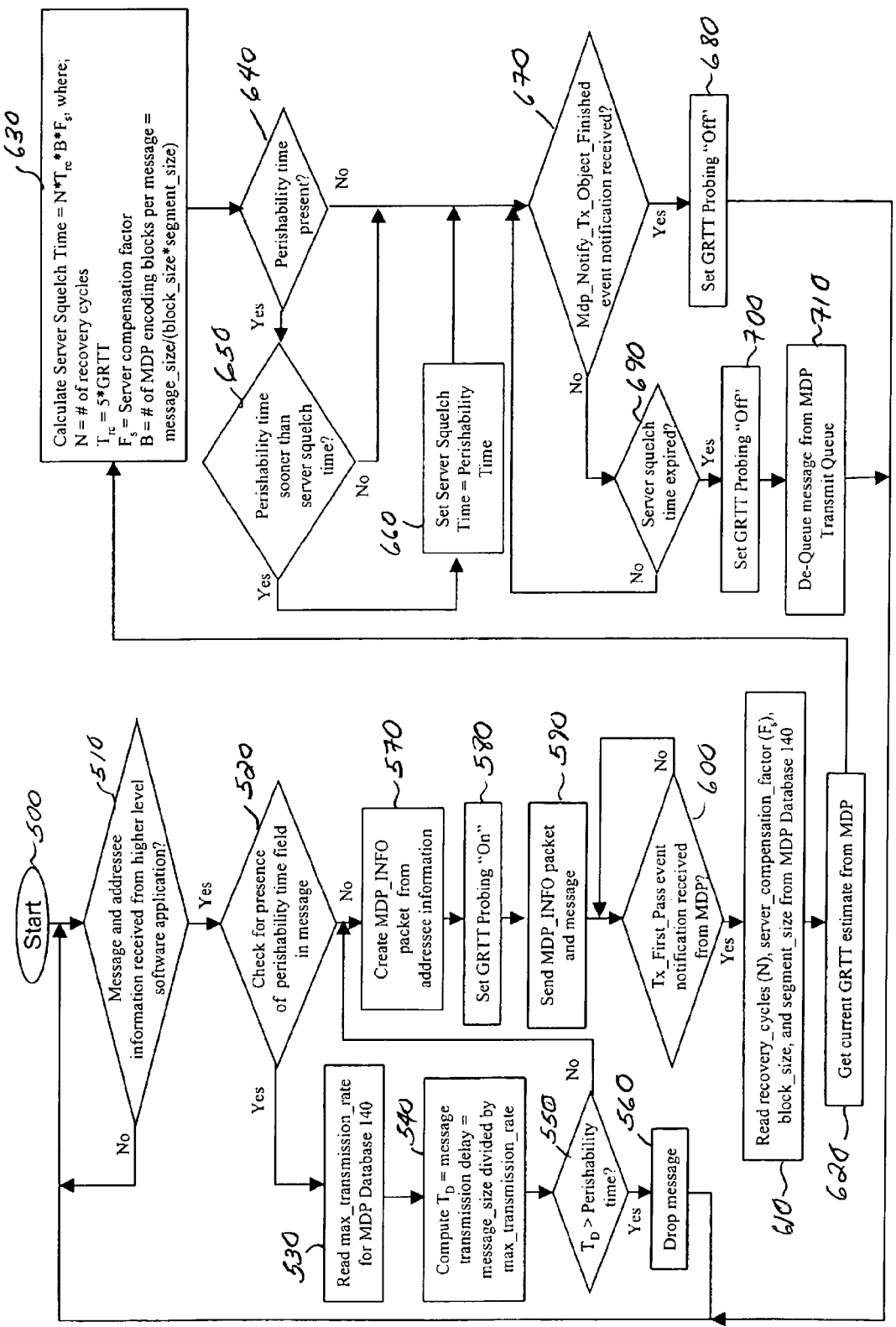
FIG. 5 is a flowchart of an MDP server operations module, shown in FIG. 2, used in an example embodiment of the present invention.

FIG. 5 is a flowchart of the MDP server operations module 110, shown in FIG. 2, used in an example embodiment of the present invention. The MDP server operations module 110 includes operation 500 through operation 710 shown in FIG. 5.

The MDP server operations module 110 begins execution in operation 500 and immediately proceeds to operation 510. In operation 510 it is determined whether a message having addressee information therein has been received from a higher level software application. If no message has been received then the MDP server operations module 110 simply waits at operation 510 until one is received. If a message is received, processing proceeds to operation 520 where a field in the message (not shown) is checked for a perishability time value. If a perishability time field is present in the message this indicates that the message must be sent within the specified time period and processing proceeds to operation 530. In operation 530, the maximum transmission rate is read from the MDP database 140. Thereafter, in operation 540, a message transmission delay ($T_D$) is computed by dividing the message size by the maximum transmission rate. In operation 550, it is determined whether the message transmission delay ($T_D$) is greater the perishability time. If the message transmission delay ($T_D$) is greater then the perishability time, then processing proceeds to operation 560 or the message is simply dropped. The message is dropped in operation 560 because it would take longer to transmit the message then permitted by the perishability time. Thereafter, processing proceeds from operation 560 back to operation 510 where the MDP server operations module 110 waits for another message to come in.

However, if no perishability time field is provided or the message transmission delay is not greater than the perishability time, then processing proceeds to operation 570. In operation 570, the MDP information packet is generated based upon the addressee information supplied in the message. Thereafter, in operation 580 GRTT probing is turned on. GRTT probing was turned off in operation 220 of FIG. 3, and by turning GRTT probing on messages will be periodically sent to nodes in network 10 and the round-trip time from each node would be measured. In operation 590, the MDP information packet, shown in FIG. 7, is sent over network 10. In operation 600, it is determined whether a transaction first pass event (Tx_First_pass) notification has been received from MDP. This transaction first pass event notification is an indication whether the entire message has been sent by MDP. The transaction first pass event notification is not a guarantee of receipt by any nodes or terminals. If the transaction first pass event notification was not received, the MDP server operations module 110 simply waits at operation 600 until notification is received.

Upon receipt of the transaction first pass event notification, processing proceeds to operation 610. In operation 610, recovery cycles (N), server compensation factor ($F_S$), block size (B) and segment size (S) are read from MDP database 140. Recovery cycles (N) is a time period that the server will wait in order to give the receiving nodes or terminals an opportunity to request correction of messages received. The server compensation factor ($F_S$) is an additional period time built-in as a safety factor that the server will wait. Block size (B) is the number of packets or segments MDP will send in each block. Segment size (S) is the size in bytes of each segment or packet. Thereafter, in operation 620, the GRTT estimates set for this MDP session in operation 240 of FIG. 3 is retrieved from MDP. Then, in operation 630, a server squelch time is computed using the formula server squelch time=$N*T_{rc}*B*F_S$, where $T_{rc}$ is 5*GRTT. The server squelch time is used to prevent the server from attempting to repair or send messages indefinitely, as is discussed in further detail ahead.

Once the server squelch time is computed, processing proceeds to operation 640. In operation 640, it is determined whether a perishability time was supplied with the message by the higher level software sending the message. If a perishability time is present, processing proceeds to operation 650. If the perishability time is less than the server squelch time computed in operation 630 then processing proceeds to operation 660 where the server squelch time is set to the perishability time. This done so that the server will not attempt to transmit or correct messages beyond their perishability time. If there is no perishability time present, or the perishability time is less than the computed server squelch time, or the server squelch time was set to the perishability time in operation 660, then processing proceeds to operation 670. In operation 670, it is determined whether the MDP notify transaction object finished (Mdp_Notify_Tx_Object_Finished) event notification was received. This MDP notify transaction object finished event notification is an indication from MDP that no responses or negative acknowledgments have been received from any recipients of the message and is based on the expiration of a finite period time. It is assumed if no responses are received from any recipients that all recipients have received the message. If the MDP notify transaction object finish event notification was received then processing proceeds to operation 680 where GRTT probing is set off. GRTT probing is set off in operation 680 since the message is assumed to have been sent and received. Thereafter, processing proceeds back to operation 510 where the MDP server operations module 110 waits for another message to be processed.

Still referring to FIG. 5, if however the MDP notify transaction object finished event notification is not received, processing proceeds to operation 690. In operation 690, it is determined whether the server squelch time computed in operation 630 has expired yet. If the server squelch time has not expired, then processing returns to operation 670 and repeats until either the MDP notify transaction object finished event notification is received or the squelch time has expired. If the squelch time has expired, then processing proceeds to operation 700 where the GRTT probing is turned off. In this case it is assumed that the entire message has not been received by all designated recipients. Further, since the squelch time has expired, the MDP server operations module 110 will not make further attempts at sending or repairing this particular message. Thereafter, processing proceeds to operation 710 where the message is de-queued from the MDP transmit queue (not shown) which prevents the message from being retransmitted or repaired by this MDP session.

Figure 6:
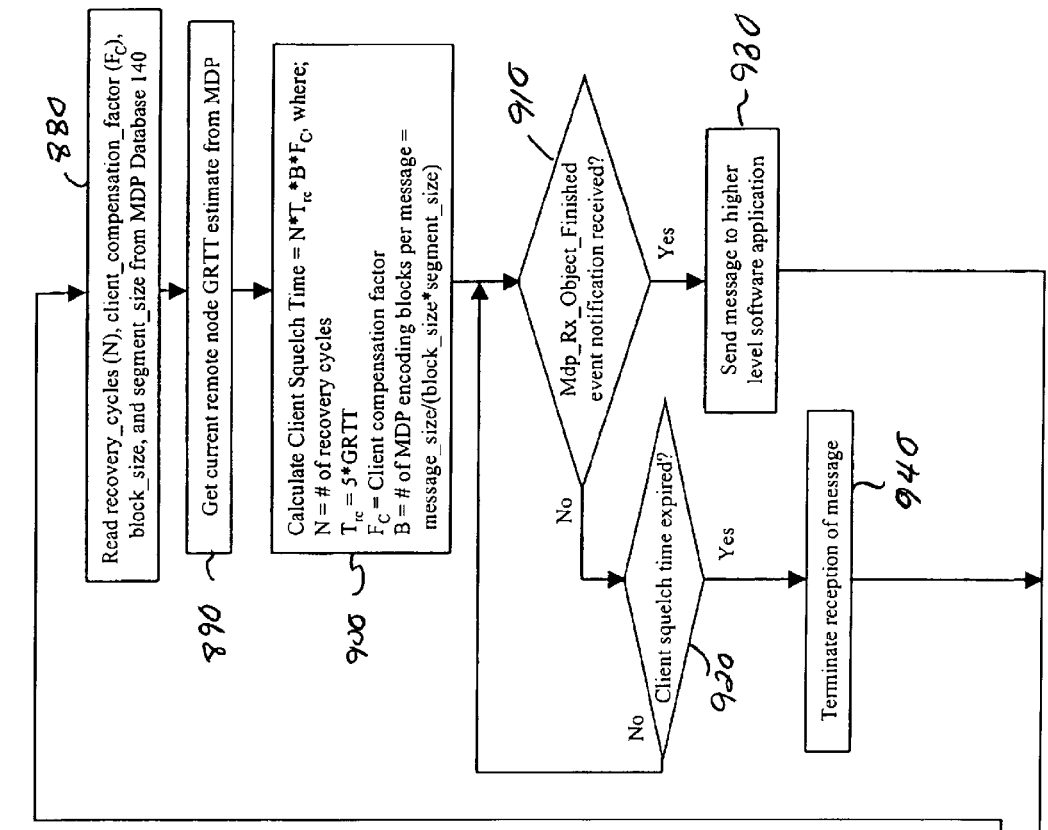
FIG. 6 is a flowchart of an MDP client operations module, shown in FIG. 2, used in an example embodiment of the present invention.
Figure 6:
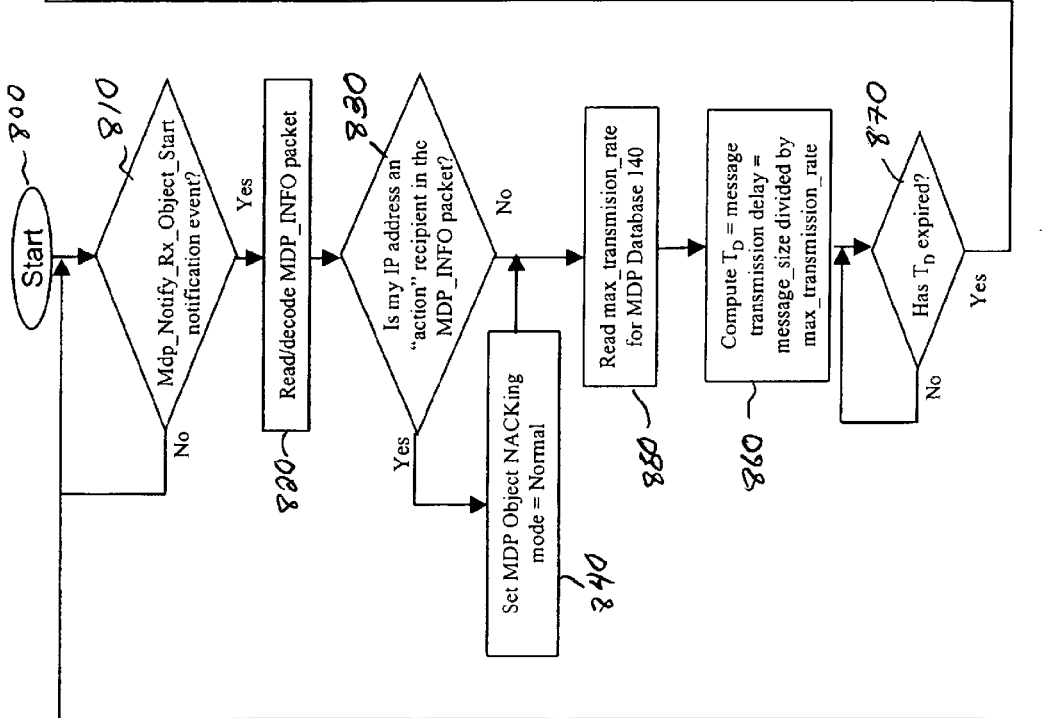

FIG. 6 is a flowchart of an MDP client operations module 130, shown in FIG. 2, used in an example embodiment of the present invention. The MDP client operations module 130 includes operation 800 through operation 940 shown in FIG. 6.

The MDP client operations module 130 begins execution in the operation 800 and immediately proceeds to operation 810. In operation 810, it is determined whether an MDP notify received object start (mdp_Notify_Rx_Object_Start) notification event has occurred. The MDP notify received object start notification event serves to indicate that a message has been received by the client workstation. If no message has been received, then processing loops back to operation 810 until the messages received. When messages are received processing proceeds to operation 820 where the MDP information packet, shown in FIG. 7, is read and decoded. Thereafter, processing proceeds to operation 830 where it is determined if byte field 1020 in the MDP information packet, shown in FIG. 7, is set for an action recipient. If byte field 1020 is set for an action recipient, then processing proceeds to operation 840. In operation 840, the MDP object nacking mode is set to normal. In a normal nacking mode the client workstation would transmit a negative acknowledgment when a packet or a portion of a packet is missing for this message only. However, this embodiment of the present invention may be modified so that the client workstation to send an acknowledgment upon receipt of the MDP information packet, shown in FIG. 7.

Regardless of byte field 1020 being set for an action recipient, processing proceeds to operation 850. In operation 850, the maximum transmission rate for this MDP session is read from MDP database 140. In operation 860, the message transmission delay ($T_D$) time is computed by taking the message size and dividing it by the maximum transmission rate. Thereafter, in operation 870, it is determined whether the message transmission delay time has expired. If the message transmission delay time has not expired then processing loops back to operation 870 until it does expire and processing proceeds to operation 880. This allows a finite period of time to expire so that the entire message may be received.

Still referring to FIG. 6, in operation 880, recovery cycles (N), client compensation factor ($F_C$), block size (B) and segment size (S) are read from MDP database 140. Recovery cycles (N) is a time period that the client will wait in order to give the receiving nodes or terminals an opportunity to request correction of messages received. The client compensation factor ($F_C$) is an additional period of time built-in as a safety factor that the client will wait. Block size (B) is the number of packets or segments MDP will send in each block. Segment size (S) is the size in bytes of each segment or packet. Thereafter, in operation 890, the GRTT estimate set for this MDP session in operation 240 of FIG. 3 is retrieved from MDP. Operation 890 is done remotely and requires access by the client to the server to retrieve the GRTT estimate. Then, in operation 900, a client squelch time is computed using the formula, server squelch time= $N*T_{rc}*B*F_C$, where $T_{rc}$ is 5*GRTT. The client squelch time is used to prevent the client from waiting for further repairs or re-sends beyond the point at which the server will also stop any further transmissions related to the message.

Still referring to FIG. 6, in operation 910, it is determined whether MDP received object finish (Mdp_Rx_Object_Finished) event notification was received. The MDP received object finish event notification serves to indicate that the client has received the entire message. If the client has received the entire message processing proceeds to operation 930. In operation 930, the message is sent by the MDP client operations module 130 to the appropriate higher level software application. However, if the MDP received object finish event notification was not received in operation 910, then processing proceeds to operation 920. In operation 920, it is determined whether the client squelch time has expired. If the client squelch time has not expired, then processing loops back to operation 910 until either the MDP received object finish event notification is received or the client squelch time has expired. If it is determined in operation 920 that the client squelch time has expired, then processing proceeds to operation 940 where the MDP client operations module 130 terminates reception of the message. Thereafter, processing loops back to operation 810 where the MDP client operations module 13 waits for any further messages.

FIG. 7 is a table of an MDP information packet used in an example embodiment of the present invention. The table shown in FIG. 7 contains a description of what appears to each byte of the MDP information packet. In byte field 1000 the number of addressees or client workstations that are to receive the message is provided in the first four bytes. Byte field 1010, bytes 5–8, provides the Internet protocol (IP) address for this particular client workstation. Thereafter, in byte field 1020, bytes 9–12, the emission control setting is provided. Where the emission control setting is disabled, this is indicative of an action recipient and if the emission control setting is enabled, this is indicative of an info recipient. As previously discussed, an action recipient will send negative acknowledgment's whenever an incomplete packet or missing packet in a message exists. However, an info recipient will only send a negative acknowledgment when an MDP information packet is received. Thereafter, in the MDP information packet shown in FIG. 7, byte fields 1000, 1010, and 1020 are repeated for each recipient of this particular multicast message. Where the embodiments of the present invention are utilized in a low bandwidth network 10 environment, it has been found that a maximum of sixteen recipient's for particular message makes for a more efficient network operation. However, depending on the type of network 10 being used, any number of recipient may be designated up to $2^{32}$ minus one.

Using the embodiments of the present invention, a systems administrator may find tune and manage an otherwise slow and unreliable network with minimal overhead. The embodiments of the present invention are ideally suited for a wireless communications network. However, the embodiments the present invention may be used in any type packet switched network. Further, using the embodiments of the present invention a system's administrator may modify parameters used to control the sending and receiving of messages so that the network operates at maximum efficiency. Also, the embodiments of the present invention can assure that individuals or workstations identified as critical recipient of a message receive that message in its entirety. However, in those cases where the identified recipients are not deemed to be critical recipients, no bandwidth is used to repair or receive corrupted packets. Therefore, the overhead needed to send and receive multicast messages is kept to absolute minimum.

While we have shown and described only a few examples herein, it is understood that numerous changes and modifications as known to those skilled in the art could be made to the present invention. For example, reference has been made to the use radio and microwave communications, but the embodiments of the present invention are not limited to these form of communications. The embodiments of the present invention will operate in any type of local or wide area network using anything from twisted pair over the public switched telephone network to leased lines as well as coax and fiber optic cable. Further, any sort of high-level communications software may be used for communications in the network. Therefore, we do not wish to be limited to the details shown and described herein, but intend to cover all such changes and modifications as are encompassed by the scope of the appended claims.

We claim:

1. A system for multicasting messages to a plurality of receiving network processors in a network, comprising:

a MDP database table comprising a plurality of parameters used to manage transmission by at least one transmitting network processor in the network and reception of multicast messages in the network by a plurality of the receiving network processors;

a MDP initialization module associated with the at least one transmitting network processor which reads a plurality of parameters from the MDP transmission database table to initialize a MDP transmission session by the at least one transmitting network processor utilizing the plurality of parameters;

a MDP initialization module associated with each of a plurality of receiving network processors which reads a plurality of parameters from the MDP database table to initialize a MDP receiving session by the plurality of receiving network processors utilizing the parameters;

a MDP operations module associated with the at least one transmitting network processor which receives requests to transmit messages, creates a MDP information packet for each message, and transmits each message to each of the plurality of receiving network processors designated in the MDP information packet; and a MDP operations module associated with each of the plurality of receiving network processors which receives messages transmitted by the MDP operations module associated with the at least one transmitting network processor, and transmits the messages which are received to a higher level software application;

wherein the plurality of parameters read by the MDP initialization module of the at least one transmitting network processor comprise an initial GRTT value, a recovery cycle, a compensation factor, a block size, and a segment size, the MDP operations module of the at least one transmitting network processor computes a squelch time of the at least one transmitting network processor based on the recovery cycle, the initial GRTT value, the compensation factor, the block size, and a segment size, the at least one transmitting network processor server discontinuing attempting to repair messages when the squelch time expires.

2. The system recited in claim 1, wherein:

the MDP initialization module of the at least one transmitting processor activates GRTT probing upon initial activation, wherein GRTT probing is a periodic sending of messages to the plurality of receiving network processors in the network and measures a time required to receive a response; and the MDP operations module associated with the at least one transmitting network processor stopping GRTT probing and de-queuing a message when the squelch time expires.

3. The system recited in claim 2, wherein:

the plurality of parameters read by the MDP initialization module of the at least one transmitting processor comprise an initial GRTT value, a maximum GRTT value, a GRTT probe minimum interval value, and a GRTT probe maximum interval value.

4. The system recited in claim 3, wherein the MDP operations module of the at least one transmitting network processor comprises:

means for generating a GRTT probe in order to measure a greatest round-trip time between the at least one transmitting network processor and updating the GRTT initial value stored in the MDP database table.

5. The system recited in claim 4, wherein:

the GRTT probe is periodically transmitted to each of the plurality of receiving network processors starting at the GRTT probe minimum interval value and increasing an interval between transmissions of the GRTT probe until the interval equals the GRTT probe maximum interval value.

6. The system recited in claim 1, wherein:

the MDP operations module of the at least one transmitting network processor de-queues a message when the squelch time expires.

7. The system recited in claim 5, wherein the MDP operations module of the at least one transmitting network processor comprises:

means for computing a squelch time; and means for stopping GRTT probing and de-queuing a message when the squelch time expires.

8. The system recited in claim 1, wherein:
the MDP initialization module of the plurality of receiving network processors reads a stream integrity value and a nacking mode value from the MDP database table.

9. The system recited in claim 8, wherein:
the MDP operations module of the plurality of receiving network processors does not send a negative acknowledgment when a message is received with missing elements when a field in the MDP information packet indicates that the receiving network processor on which the MDP operations module executes is an info client.

10. The system recited in claim 9, wherein:
the MDP operations module of the plurality of receiving network processors sends a negative acknowledgment when a message is received with missing elements when the MDP information pack designates the receiving network processor on which the MDP operations module executes is an action client.

11. The system recited in claim 10, wherein:
the MDP operations module of the plurality of receiving network processors computes a message delay time based upon a message size and a maximum transmission rate and waits for a period time equal to the message delay time upon receipt of an MDP information packet.

12. The system recited in claim 11, wherein the MDP operations module of the plurality of receiving network processors further comprises:
means to compute a squelch time; and
means to terminate reception of a message when the squelch time has expired.

13. A computer program, executable by a computer, embodied on a computer readable medium for multicasting messages to a plurality of receiving network processors in a network, comprising:
a MDP database table comprising a plurality of parameters used to manage transmission by at least one transmitting network processor in the network and reception of multicast messages in the network by a plurality of the receiving network processors;
a MDP initialization module associated with the at least one transmitting network processor which reads a plurality of parameters from the MDP transmission database table to initialize a MDP transmission session by the at least one transmitting network processor utilizing the plurality of parameters;
a MDP initialization module associated with each of a plurality of receiving network processors which reads a plurality of parameters from the MDP database table to initialize a MDP receiving session by the plurality of receiving network processors utilizing the parameters;
a MDP operations module associated with the at least one transmitting network processor which receives requests to transmit messages, creates a MDP information packet for each message, and transmits each message to each of the plurality of receiving network processor designated in the MDP information packet, the MDP information packet including an emission control setting field for each of the plurality of receiving network processors designated in the information packet, the emission control setting field defining a receiving network processor as one of an action client and an info client, wherein action clients send a negative acknowledgment when a message is received with missing elements and an info client passively receives messages and does not send a negative acknowledgment when a message is received with missing elements; and
a MDP operations module associate with each of the plurality of receiving network processors which receives messages transmitted by the MDP operations module associated with at least one transmitting network processor, and transmit the messages which are received to a higher level software application.

14. The computer program recited in claim 13, wherein:
the MDP initialization module of the at least one transmitting processor activates GRTT probing upon initial activation, wherein GRTT probing is a periodic sending of messages to the plurality of the receiving network processors in the network and measuring a time required to receive a response; and
the MDP operations module associated with the at least one transmitting network processor stopping GRTT probing and de-queuing a message when the squelch time expires.

15. The new computer program recited in claim 14, wherein:
the plurality of parameters read by the MDP initialization module of the at least one transmitting processor comprise an initial GRTT value, a maximum GRTT value, a GRTT probe minimum interval value, and a GRTT probe maximum interval value.

16. The computer program recited in claim 15, wherein:
the MDP operations module of the at least one transmitting processor comprises means for generating a GRTT probe in order to measure a greatest round-trip time between the at least one transmitting network processor and updating the GRTT initial value stored in the MDP database table.

17. The computer program recited in claim 16, wherein:
the GRTT probe is periodically transmitted to each of the plurality of receiving network processors starting at the GRTT probe minimum interval value and increasing an interval between transmissions of the GRTT probe until the interval equals the GRTT probe maximum interval value.

18. The computer program recited in claim 13, wherein:
the plurality of parameters read by the MDP initialization module of the at least one transmitting processor comprise an initial GRTT value, a recovery cycle, a compensation factor, a block size, and a segment size.

19. The computer program recited in claim 18, wherein:
the MDP operations module of the at least one transmitting processor computes a squelch time of the at least one transmitting network processor based on the recovery cycle, the initial GRTT value, the compensation factor, the block size, and a segment size.

20. The computer program recited in claim 19, wherein:
the MDP operations module of the at least one transmitting processor de-queues a message when the squelch time expires.

21. The computer program recited in claim 17, wherein the MDP operations module of the at least one transmitting processor comprises:
means for computing a squelch time; and
means for stopping GRTT probing and de-queuing a message when the server squelch time expires.

22. The computer program recited in claim 13, wherein:
the MDP initialization module of the plurality of receiving network processors reads a steam integrity value and a nacking mode value from the MDP database table.

23. The computer program recited in claim 22, wherein:
the MDP operations module of the plurality of receiving network processor does not send a negative acknowledgment when a message is received with missing elements when a field in the MDP information packet indicates that the receiving network processor on which the MDP operations module executes is an info client.

24. The computer program recited in claim 23, wherein:
the MDP operations of the plurality of receiving network processors module sends a negative acknowledgment when a message is received with missing elements when the MDP information packet designates the receiving network processor on which the MDP operations module executes is an action client.

25. The computer program recited in claim 24, wherein:
the MDP operations module of the plurality of receiving network processors computes a message delay time based upon a message size and a maximum transmission rate and waits for a time period equal to the message delay time upon receipt of an MDP information packet.

26. The computer program recited in claim 25, wherein the plurality of receiving network processors comprises:
means to compute a squelch time; and
means to terminate reception of a message when the squelch time has expired.

27. A method which transmits multicast messages from at least one transmitting network processor to a plurality of receiving network processors in a network, comprising:
the at least one transmitting network processor reading a plurality of parameters from a MDP database which initializes and controls the transmission of a multicast message by the at least one transmitting network processor;
a plurality of the plurality of the receiving network processors reading a plurality of parameters from a MDP database which initializes and controls reception of the multicast message by the plurality of the receiving network processors which read the plurality of parameters;
transmitting the multicast message from the at least one network transmitting processor to the plurality of receiving network processors which read the plurality of parameters when a message delay time does not exceed a time computed to transmit the multicast message or the message delay time does not exceed a perishability time contained within the multicast message;
transmitting a negative acknowledgment to the at least one of the transmitting network processor when at least one receiving network processor determines that data in the multicast message is missing and when the at least one of the receiving network processor which read the parameters was designated as an action entity within a field contained with in the MDP information packet; and
passively receiving the multicast message when the at least one receiving network processor determines that data in the multicast message is missing and when the at least one of the receiving network processor which read the parameters was designated as an info entity within a field contained with in the MDP information packet.

28. The method recited in claim 25, wherein:
when transmitting the multicast message to the plurality of receiving network processors, a GRTT probe is also transmitted periodically to the plurality of receiving network processors which read the parameters in order to determine a greatest round-trip time required for a message to be received by the plurality of receiving network processors which read the parameters and an acknowledgment to be sent back to the at least transmitting network processor.

29. The method recited in claim 28, wherein when the greatest round trip time is determined, the method further comprises:
adjusting the plurality of parameters stored in the MDP database based upon the greatest round-trip time.

30. The method recited in claim 28, comprising:
the at least one transmitting network processor calculates a squelch time based upon the parameters retrieved from the MDP database; and
the squelch time is set equal to the perishability time by the at least one transmitting network processor when the squelch time exceeds the perishability time.

31. The method recited in claim 30, comprising:
the at least one transmitting network processor monitors for negative acknowledgments, transmitted by the plurality of receiving network processors which read the parameters, to be received when the squelch time has not been exceeded.

32. The method recited in claim 31, comprising:
retransmitting a portion of the multicast message when a negative acknowledgment is received from at least one receiving network processor when all data in the multicast message has not been received and a squelch time has not been exceeded.

33. The method recited in claim 32, comprising:
computing a squelch time based upon the plurality of parameters stored in the MDP database; and
transmitting a negative acknowledgment when a portion of the multicast message has not been received by at least one of the receiving network processors and the squelch time has not been exceeded.

34. The method recited in claim 33, wherein:
transmitting a negative acknowledgment when a portion of the multicast message has not been received by at least one of the receiving network processors occurring only when the at least one of the receiving network processors has been designated as an action receiving network entity in the MDP information packet.

35. The method recited in claim 34, wherein:
the squelch time is computed as equal to $N*T_{rc}*B*F_C$, where $T_{rc}$ is $5*GRTT$, N is a recovery cycles, $F_C$ is a compensation factor, and B is a block size based on a number of blocks in the message times a segment size.

* * * * *